US008782015B2

(12) United States Patent
Enenkiel (10) Patent No.: US 8,782,015 B2
(45) Date of Patent: Jul. 15, 2014

(54) SYSTEMS AND METHODS FOR PROCESSING DATA IN A WEB SERVICES ENVIRONMENT

(75) Inventor: Achim Enenkiel, Karlsruhe (DE)

(73) Assignee: SAP AG, Walldorf (DE)

( * ) Notice: Subject to any disclaimer, the term of this patent is extended or adjusted under 35 U.S.C. 154(b) by 783 days.

(21) Appl. No.: 11/494,576

(22) Filed: Jul. 28, 2006

(65) Prior Publication Data
US 2007/0027835 A1 Feb. 1, 2007

(30) Foreign Application Priority Data
Jul. 28, 2005 (EP) ..................................... 05106974

(51) Int. Cl.
*G06F 7/00* (2006.01)
*G06F 17/30* (2006.01)

(52) U.S. Cl.
USPC .............................. 707/690; 707/944; 705/33

(58) Field of Classification Search
USPC ................... 707/10, 1, 690, 944, 950; 705/30
See application file for complete search history.

(56) References Cited

U.S. PATENT DOCUMENTS

| | | | | |
|---|---|---|---|---|
| 5,903,881 | A * | 5/1999 | Schrader et al. | 705/42 |
| 6,081,790 | A * | 6/2000 | Rosen | 705/40 |
| 6,128,602 | A * | 10/2000 | Northington et al. | 705/35 |
| 6,604,135 | B1 | 8/2003 | Rogers et al. | |
| 7,188,333 | B1 * | 3/2007 | LaMotta et al. | 717/106 |
| 7,343,585 | B1 * | 3/2008 | Lau et al. | 717/108 |
| 7,366,460 | B2 * | 4/2008 | O'Farrell et al. | 455/3.06 |
| 7,403,917 | B1 * | 7/2008 | Larsen | 705/33 |
| 7,603,314 | B2 * | 10/2009 | Siksa | 705/40 |
| 2002/0065772 | A1 * | 5/2002 | Saliba et al. | 705/40 |
| 2003/0018661 | A1 | 1/2003 | Darugar | |
| 2003/0023471 | A1 * | 1/2003 | Kettler et al. | 705/8 |
| 2003/0055624 | A1 | 3/2003 | Fletcher et al. | |
| 2003/0055868 | A1 | 3/2003 | Fletcher et al. | |
| 2003/0074288 | A1 * | 4/2003 | Quine | 705/33 |
| 2003/0093436 | A1 | 5/2003 | Brown et al. | |
| 2003/0110242 | A1 | 6/2003 | Brown et al. | |
| 2003/0163513 | A1 | 8/2003 | Schaeck et al. | |
| 2003/0182206 | A1 * | 9/2003 | Hendrix et al. | 705/26 |
| 2003/0187841 | A1 | 10/2003 | Zhang et al. | |
| 2003/0225638 | A1 * | 12/2003 | Secola | 705/30 |
| 2004/0003130 | A1 | 1/2004 | Becker et al. | |
| 2004/0006571 | A1 * | 1/2004 | Anagol-Subbarao et al. | 707/104.1 |
| 2004/0045005 | A1 | 3/2004 | Karakashian | |

(Continued)

OTHER PUBLICATIONS

Smit, Service Oriented Paradigms in Industrial Automation, published Feb. 17, 2005.*

(Continued)

*Primary Examiner* — Jeffrey A Burke
(74) *Attorney, Agent, or Firm* — Finnegan, Henderson, Farabow, Garrett & Dunner, LLP (57) ABSTRACT

Systems and methods are disclosed for processing data in a web service environment. In one implementation, the data processing system includes a Web service for receiving a request via a network. The request includes a first set of data. The system further includes a storage device, coupled to the Web service, for storing a second set of data. The Web service is configured to perform certain functions in response to the request, including accessing the second set of data, performing a data consistency check of the first and second sets of data, generating a response indicating a result of the data consistency check, and sending the response to the requestor via the network.

26 Claims, 4 Drawing Sheets

(56) References Cited

U.S. PATENT DOCUMENTS

| | | | |
|---|---|---|---|
| 2004/0064375 A1* | 4/2004 | Randell et al. | 705/26 |
| 2004/0064503 A1 | 4/2004 | Karakashian et al. | |
| 2004/0073500 A1* | 4/2004 | Owen, Jr. | 705/30 |
| 2004/0111346 A1* | 6/2004 | Macbeath et al. | 705/35 |
| 2004/0143522 A1* | 7/2004 | Wall et al. | 705/34 |
| 2004/0172360 A1* | 9/2004 | Mabrey et al. | 705/40 |
| 2004/0177018 A1* | 9/2004 | Fenger et al. | 705/35 |
| 2004/0205011 A1* | 10/2004 | Northington et al. | 705/35 |
| 2005/0021464 A1* | 1/2005 | Lindauer et al. | 705/40 |
| 2005/0027648 A1* | 2/2005 | Knowles et al. | 705/38 |
| 2005/0044015 A1* | 2/2005 | Bracken et al. | 705/30 |
| 2005/0044165 A1* | 2/2005 | O'Farrell et al. | 709/213 |
| 2005/0055324 A1* | 3/2005 | Godeby et al. | 707/1 |
| 2005/0187852 A1* | 8/2005 | Hwang | 705/36 |
| 2005/0228728 A1* | 10/2005 | Stromquist | 705/30 |
| 2005/0283502 A1* | 12/2005 | Heitner et al. | 707/200 |
| 2006/0184569 A1* | 8/2006 | Aakolk et al. | 707/103 R |
| 2006/0200747 A1* | 9/2006 | Bhatia et al. | 715/500.1 |
| 2006/0229958 A1* | 10/2006 | Sergio et al. | 705/35 |
| 2006/0294383 A1* | 12/2006 | Austel et al. | 713/176 |
| 2007/0067299 A1* | 3/2007 | Kozam et al. | 707/10 |
| 2007/0083444 A1* | 4/2007 | Matthews et al. | 705/30 |

OTHER PUBLICATIONS

EPO Communication and Search Report, dated Feb. 10, 2006 (7 pages).

Dalal, S. et al: "Coordinating Business Transactions on the Web", vol. 7, No. 1, pp. 30-39, Jan. 2003, IEEE Internet Computing.

Khoshafian S., "Web Services and Virtual Enterprises," Internet Article, May 2002, pp. 1-15, XP002364615, Retrived from the Internet: URL: http://www.webservicesarchitect.com/content/articles/khoshafian01.asp>,Tect, Chicago, IL.

http://w3.org/TR/wsdl.html.

UDDI Seminar Presentation, May 6, 2003, translated from http://n.ethz.ch/student/jodaniel/37-310/slides/UDDI_MarcoCicolini.ppt.

Data Structures, UDDI Version 2.0, translated from http://n.ethz.ch/student/jodaniel/37-310/slides/UDDI_DominikKaspar.ppt.

Jurgen Mauerern, "SOAP, UDDI and WSDL," published Feb. 19, 2004 (2 pages).

Chris Peiris, "Programming Model for UDDI Runtime," published Feb. 5, 2003 (23 pages).

Carlos C. Tapang, "Web Services Description Language (WSDL) Explained," Jul. 2001 (32 pages).

* cited by examiner

SYSTEMS AND METHODS FOR PROCESSING DATA IN A WEB SERVICES ENVIRONMENT

TECHNICAL FIELD

The present disclosure relates to the field of data processing and, more particularly to data processing systems and methods for processing data in a Web service environment.

BACKGROUND INFORMATION

Web services offer the dual promise of simplicity and pervasiveness. Web services represent the next level of function and efficiency in e-business. A Web service can be viewed as any mechanism by which an application or data processing service can be provided to other applications on the Internet.

Web services may be informational or transactional. That is, some services provide information of interest to the requester while other services may actually lead to the invocation of business procedures. Examples of Web services include stock quote services, services to retrieve news from Web news sources, currency conversion services, etc. For example, U.S. Pat. No. 6,604,135, issued to Rogers et al. on Aug. 5, 2003, discloses a method and system for location based Web services.

Various approaches for implementing Web services are known, such as described in U.S. Patent Publication Nos. 2003/0093436A1, 2003/0055868A1, 2003/0055624A1, 2003/0018661A1, 2003/0110242A1, 2003/0163513A1, 2004/0064503A1, 2004/0045005A1, 2004/0003130A1, and 2003/0187841A1.

Some types of Web services are responsive to simple object access protocol (SOAP) messages. SOAP is an application invocation protocol that defines a protocol for exchanging information encoded as XML messages. Normally, these services are described by WSDL (Web Service Description Language) notation stored in WSDL documents. A WSDL document can be stored in numerous ways such as in a file, in a DB2 XML registry/repository, or in a DB2 based UDDI registry, for example. UDDI (Universal Description, Discovery, Integration) is a protocol for describing Web services such that interested parties may easily discover them. Service providers may register their services in a UDDI, specifying technical information about how to invoke the service. Often, a WSDL document is stored in a UDDI registry in order to define the messages a particular Web services accepts and generates.

The design of UDDI allows enterprises that own Web service enabled applications to publish data about themselves and their services. By providing this information, UDDI implements a simplified form of searching for those interested in locating a particular service in which to fulfill an application process. The conventional UDDI search is focused on single search criteria such as business name, business location, business categories, business identifier, service type by name, and discovery URL (Uniform Resource Locator).

SUMMARY

In one embodiment, a data processing system is provided that comprises a Web service for receiving a request from a requestor via a network. The request contains a first set of data. The system further comprises a storage device, coupled to the Web service, for storing a second set of data. The Web service, in response to the request, is configured to: (i) access the second set of data, (ii) perform a data consistency check of the first and second sets of data, (iii) generate a response indicating a result of the data consistency check, and (iv) send the response to the requestor via the network.

Embodiments consistent with the invention may advantageously enable an automatic data consistency check. This is useful for various applications, such as industrial control systems, accounting systems, enterprise resource planning systems, and other distributed data processing systems that store related datasets and/or replicated datasets.

In one embodiment, the request for performing a data consistency check contains an identifier of the requestor. The identifier is used for retrieval of the second dataset that corresponds to the first dataset for performance of the data consistency check. This may advantageously enable use of the Web service for various datasets stored on various computer systems. The identifier received by the Web service as part of the request identifies the requesting computer system and, thus, the respective set of data which needs to be accessed by the Web service in order to perform the data consistency check.

In one embodiment, the request is received as an extended markup language (XML) file that comprises the identifier and data items of the set of data that need to be checked for consistency. The XML file may be received in a SOAP envelope.

In one embodiment, the response that is generated by the Web service identifies those data items that have been found to be inconsistent in the first and second datasets, if any. Such an itemized response facilitates the correction of the inconsistency and the analysis of the root cause of the inconsistency problem.

In another embodiment, the second set of data contains a plurality of data items. Each data item is time stamped. For example, the time stamp indicates the posting date of the data item. The first set of data contains a plurality of data items for which the consistency with the corresponding data items contained in the second set of data needs to be checked. The respective request for performing the data consistency check specifies a time (e.g., a reference date). The data consistency check is performed for those data items that have a time stamp that is prior to the specified time or which equals the specified time.

In one embodiment, the data consistency check is performed in an industrial automation environment. For example, the first and second sets of data may contain control parameters for controlling electric drives, actuators, and/or other industrial automation control components. Thus, a control parameter set that is used by various automation components will remain consistent over the automation components.

In another embodiment, data processing systems consistent with the present invention may be used for accounting systems and enterprise resource planning systems. For example, in one embodiment, a payee may use a computer system to store a ledger of accounts receivables that contains a list of postings reflecting open payment items. The payee's customer (e.g., the payer) may have a respective ledger of accounts payables containing a list of postings indicating open payment items to be paid to the payee. If the accounting is correct, the ledger of accounts receivables and the ledger of accounts payables contain matching postings. In one embodiment, a consistency check of the ledger of accounts receivables and the ledger of accounts payables is initiated by a payee's computer system generating a request containing the postings to be checked and sending the request to the Web service coupled to the payer's computer system. In response, the Web service performs a consistency check and generates a response which is transmitted back to the payee's computer system.

The process of checking related accounts for consistency is also referred to as 'balance confirmation.' A prerequisite for performing a balance confirmation may include requiring that the account items are posted in compliance with the applicable regulatory requirements such that they are auditable. Accordingly, in one embodiment, each posted account has an assigned posting date. The posting dates of the account items permit selection of a subset of the account items for the balance confirmation using a reference date as a selection criterion. In one embodiment, based on a selected reference date, only those account items that have a posting date prior or equal to the reference date are considered in performing the balance confirmation check.

In one embodiment, a certified public accountant can access the payee's computer system from a remote computer system in order to read the postings from the ledger of account receivables that need to be checked for consistency with the ledger of accounts payables of a payer. The remote computer system generates the request containing the relevant postings and an identifier for identifying the payee. This request is sent to the Web service that is coupled to the payer's computer system. The Web service initiates the data consistency check for the postings contained in the request with respect to corresponding postings contained in the ledger of accounts payables of the payee. A response is generated that indicates the result of the data consistency check and the response is sent back to the remote computer system.

In another embodiment, data processing systems consistent with the invention may implement a flight booking system. The first set of data contains a plurality of data items where each data item describes a flight booking and the date when the flight booking was posted by a travel agency. The second set of data contains the flight bookings received by an airline. The flight bookings of the second set of data also have an assigned booking date that indicates when the flight booking was entered. In order to perform a consistency check of the flight bookings contained in the first and second sets of data with respect to a specific reference date or reference time, a request that specifies the reference date or time is sent to the Web service. In response the Web service performs the data consistency check of the flight bookings that have been entered prior to the reference date or time. If each flight booking contained in the first set of data has a matching flight booking in the second set of data both datasets are consistent. If this is not the case the Web service generates a respective response that indicates the one or more non-matching flight bookings. This response can trigger a workflow for correction of the data inconsistency. In addition to flight bookings the data consistency check may also encompass canceled flight bookings.

In a further embodiment, the settings or control parameters of an industrial control system are posted in the first and second sets of data. In addition, each data item may have an assigned posting date or time stamp. Thus, for example, the first set of data containing a time stamped set of control parameters (e.g., desired temperature values, pressure values, etc.) is stored in a stored program control system (SPS). The SPS is coupled to a number of automation components that receive the control parameters from the SPS. The automation components may have local storage for posting parameter sets received from the SPS, which may include time stamping the control parameters (e.g., assigning a data value that indicates the time when the respective parameter set was received from the SPS). The storage of the control parameter sets in such an auditable way may help provide evidence of the proper operation of the industrial control system (e.g., for defense against product liability claims, etc.). Further, posting such control parameters in an industrial automation system may be required by law (e.g., for pharmaceutical products, etc.).

In one embodiment, the SPS is coupled to a Web service that can perform a data consistency check with respect to a specified automation component on request of the SPS. For example, the SPS may send a request to the Web service that indicates a reference date and/or reference time. In response, the Web service identifies those postings that are stored by the automation component in its local storage that have a time stamp prior to the reference date or time. A data consistency check may then be performed relative to the respective postings contained in the first set of data stored by the SPS.

BRIEF DESCRIPTION OF THE DRAWINGS

The accompanying drawings show features of implementations consistent with the present invention and, together with the corresponding written description, help explain principles associated with the invention. In the drawings.

DETAILED DESCRIPTION

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Figure 1:
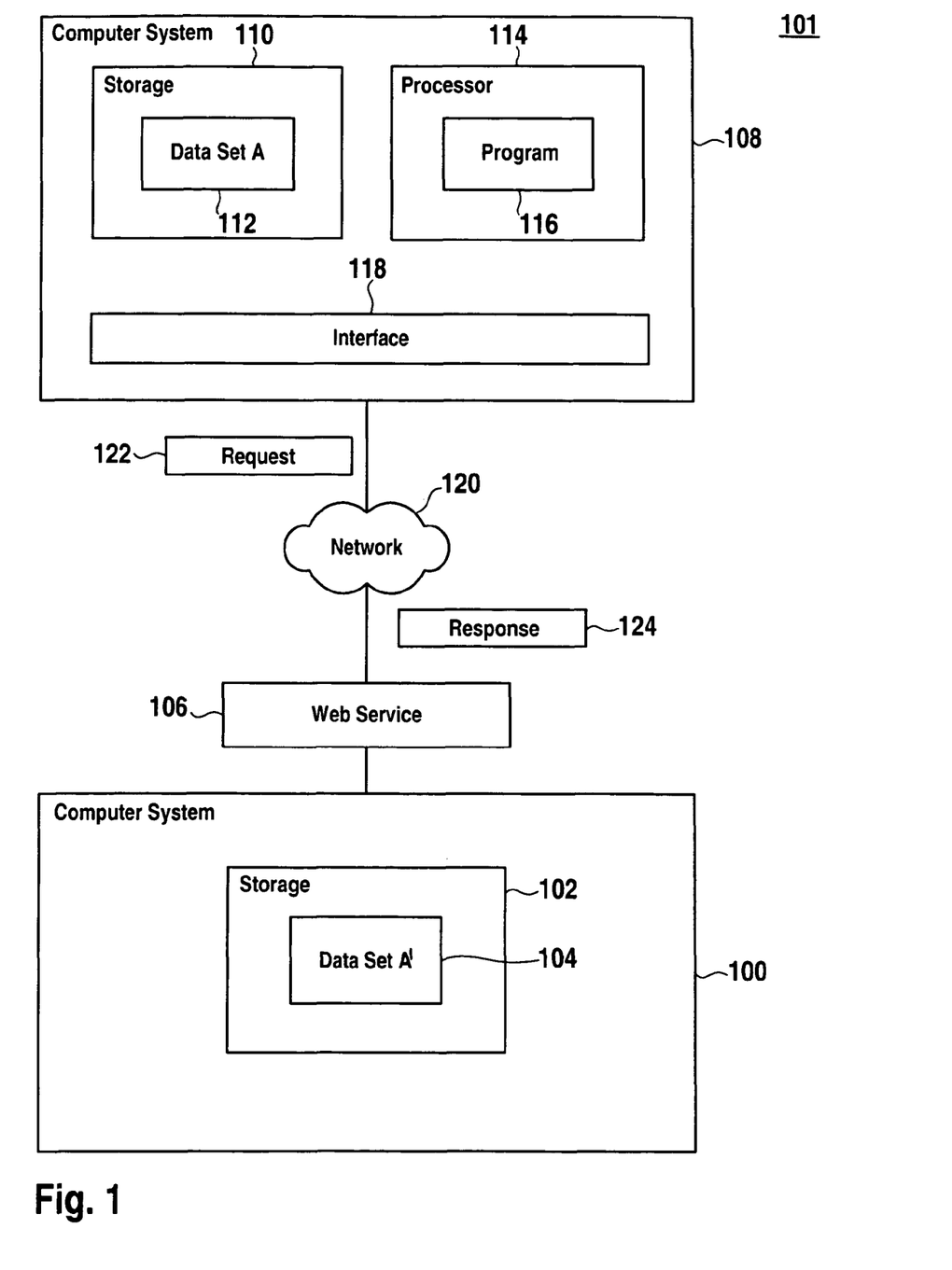
FIG. 1 is a block diagram of a first data processing system, consistent with an embodiment of the invention.

FIG. 1 shows an exemplary system 101, consistent with an embodiment of the present invention. In this example, system 101 includes a computer system 100 that includes a storage 102. The dataset A' 104 is stored in the storage 102. Computer system 100 is coupled to a Web service 106, which may be implemented on a separate computer system or as part of computer system 100. Thus, Web service 106 may be closely or loosely coupled to computer system 100.

System 101 also includes a computer system 108, which includes a storage 110 for storing a dataset A 112. The datasets A and A' are related. For example, in one embodiment, the dataset A and the dataset A' are supposed to be identical. In an-other embodiment, the dataset A' may be the result of a predefined transformation of the dataset A. The datasets A and A' may be considered to be consistent if a predefined consistency criterion is met.

Computer system 108 further includes a processor 114 for running a program 116. Further, computer system 108 includes an interface 118 for coupling computer system 108 to Web service 106 via a network 120. For example, network 120 may be an industrial Ethernet, a company's intranet, an extranet, the Internet, etc.

In one embodiment, program 116 generates a request 122 that contains the dataset A in order to initiate a data consistency check. Request 122 is sent from interface 118 of computer 108 via network 120 to Web service 106. In response, Web service 106 initiates an access operation in order to access the dataset A' from storage 102. Web service 106 applies the predefined data consistency criterion on the datasets A and A'.

In one embodiment, after performing a consistency check, Web service 106 generates a response 124 that describes the result of the data consistency check. The response may indicate whether the data consistency criterion is met or not. In addition, response 124 may specify any data items of the dataset A and A' that have led to data inconsistency, and may include other information related to datasets A and A'. Response 124 is then sent from Web service 106 to computer 108 via network 120, and is subsequently received by interface 118 of computer 108 and further processed by program 116. For example, in one embodiment, if the response indicates that the data consistency criterion has not been met, then program 116 outputs a respective alarm signal.

In one embodiment, computer systems 100 and 108 are components of an industrial control system. For example, computer system 100 may be a stored program control system and computer system 108 may be a controller of an electric drive. In this embodiment, the datasets A and A' may be replicas of a control parameter set that is used by both industrial control components.

In another embodiment, the datasets A and A' include accounting data. For example, computer system 108 may belong to a payee and computer system 100 may belong to the payee's customer (e.g., a payer). The dataset A may include a ledger of accounts receivables and the dataset A' stored on payer's computer system 100 may include a ledger of accounts payables. In order to check the payee's and the payer's accounting for consistency the data consistency check may be performed with respect to the ledger of accounts receivables and the ledger of accounts payables.

In one embodiment, program 116 is an enterprise resource planning system. In this embodiment, program 116 generates request 122 that includes postings of the dataset A (e.g., the ledger of accounts receivables), and that identifies the payee. When Web service 106 receives request 122, it determines the ledger of accounts payables for the payee identified in request 122 (e.g., the dataset A'). The postings contained in the request 122 are checked for consistency with respective postings of the datasets A' (e.g., the ledger of accounts payables). The results of the check (e.g., whether the postings are matching, whether one or more of the postings fail the data consistency check, details related to any non-matching postings used to facilitate the error analysis and correction of the accounting, etc.) are reported back to the payee's computer system 108 by means of response 124.

Figure 2:
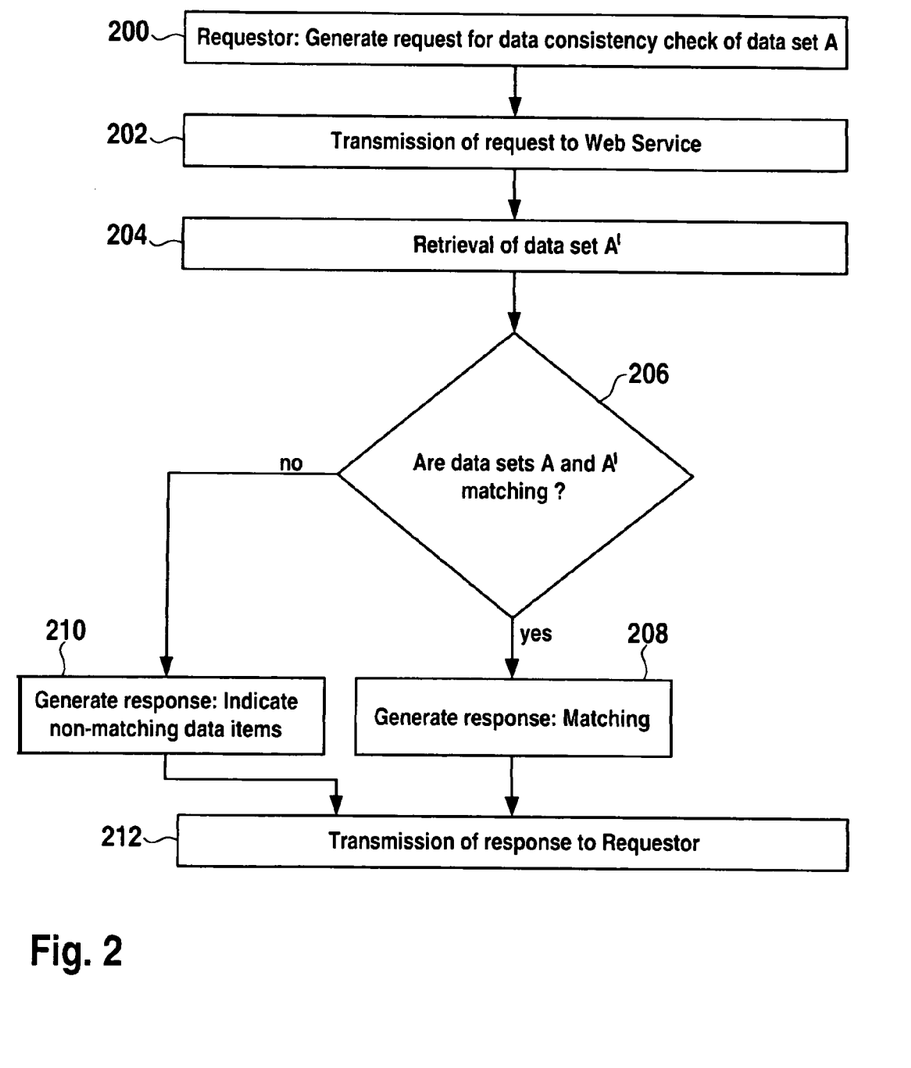
FIG. 2 is a flowchart of an exemplary method, consistent with an embodiment of the invention.

FIG. 2 shows a flowchart of an exemplary method, consistent with an embodiment of the invention. In step 200, a requestor generates a request for performing a data consistency check with respect to a dataset A. The request is sent from the requestor to a Web service (step 202). In one embodiment, the request is sent as a message in XML format and may be transmitted using a SOAP envelope. The XML message may include an identifier of the requestor.

In step 204, the Web service that has received the request performs a retrieval operation for retrieval of a dataset A' that is related to the dataset A received as part of the request. In one embodiment, the retrieval is performed by using the identifier of the requester as a key.

In step 206, the system determines whether the datasets A and A' fulfill the data consistency criterion. For example, in one embodiment, the system checks if the datasets A and A' are matching. The datasets may be considered matching if the datasets are identical, if the absolute values of respective data items contained in the datasets A and A' are identical, if the dataset A' is obtained by performing a predefined transformation on the dataset A, etc.

If the datasets are matching, a respective response is generated in step 208. If the datasets are not matching, a response is generated in step 210 that indicates the non-matching data items. The system then transmits the response back to the requestor (step 212).

Figure 3:
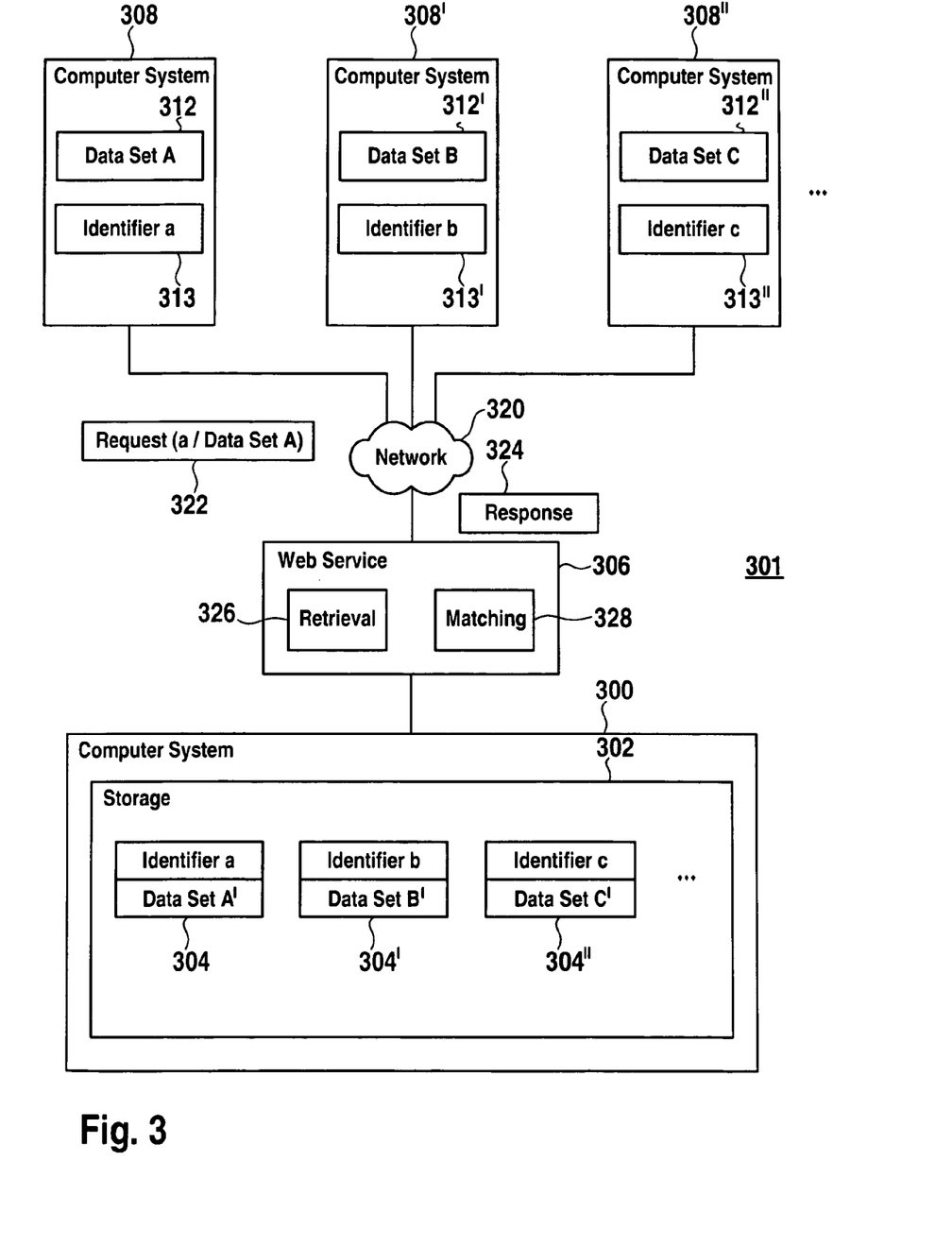
FIG. 3 is a block diagram of a second data processing system, consistent with an embodiment of the invention.

FIG. 3 shows an exemplary data processing system 301 having multiple requesters. Elements in the embodiment of FIG. 3 that correspond to elements in the embodiment of FIG. 1 are designated by like reference numerals.

Multiple computer systems 308, 308', 308", etc., are coupled to Web service 306 of computer system 300 by means of network 320. Computer system 300 may include a stored program system that integrates Web service 306, or may be coupled to Web service 306 remotely (e.g., via a network or other connection). Computer system 308 stores a dataset A 312 and an identifier a 313 that identifies computer system 308. Likewise, the computer system 308' stores a dataset B 312' and an identifier b 313' that identifies computer system 308'. Additional computer systems 308", etc., may store additional datasets C 312" and identifiers c 313", etc., that identify computer systems 308", etc.

Respective datasets A' 304, B' 304' and C' 304" are stored in storage 302 of computer system 300. The identifier a is assigned to the dataset A' in order to serve as a key for access to the dataset A'. Likewise, the identifier b is assigned to the dataset B' as a key for retrieval of the dataset B', identifier c is assigned to the dataset C' as a key for retrieval of the dataset C', etc.

Web service 306 has a retrieval component 326 and a consistency checker component 328 for application of a consistency criterion in order to determine whether two related datasets are matching or not.

In operation, any one of the computer systems 308, 308', 308", etc., may generate a request for performing a data consistency check. For example, in one embodiment, computer system 308 generates a request 322 that contains the identifier a of the requesting computer system 308 and a copy of the dataset A. In other words, the request 322 carries the identifier of the requesting computer system in addition to the dataset that is to be checked for data consistency.

Web service 306 then receives request 322 via network 320. In response to receiving the request, Web service 306 invokes its retrieval component 326. Retrieval component 326 reads the identifier contained in request 322 (e.g., the identifier a), and performs a retrieval operation using the identifier a as a search criterion. As a result, retrieval component 326 retrieves the dataset A' from storage 302.

Next, consistency checker component 328 determines whether the dataset A and the related dataset A' are matching or not. Web service 306 then generates a response 324 that reflects the result of the consistency check performed by the consistency checker component 328.

In one embodiment, the data processing system of FIG. 3 is an industrial control system. For example, computer systems 308, 308', 308", etc., may be embedded systems for controlling automation components (e.g., smart drives, actuators, etc.).

Datasets A, B, C, etc., may include control parameters (e.g., filter coefficients, temperature values, speed values, etc.) for controlling the respective automation components controlled by computer systems 308, 308', 308", etc. In one embodiment, computer system 300 stores copies of control parameter sets. At regular or at irregular time intervals, one or more of computers 308, 308', 308", etc., initiate consistency checks of their respective control parameter sets using the Web service 306 of computer system 300.

In another embodiment, data processing system 301 is used for accounting purposes. For example, each of the computer systems 308, 308', 308", etc., may belong to a different company. The companies may have a common customer that uses computer system 300. In one embodiment, the customer has a separate account of open payment items to be paid to each respective company. For example, dataset A' may be an account of open payment items payable to the company that uses the computer system 308, dataset B' may be an account of open payment items payable to the company that uses the computer system 308', etc.

Figure 4:
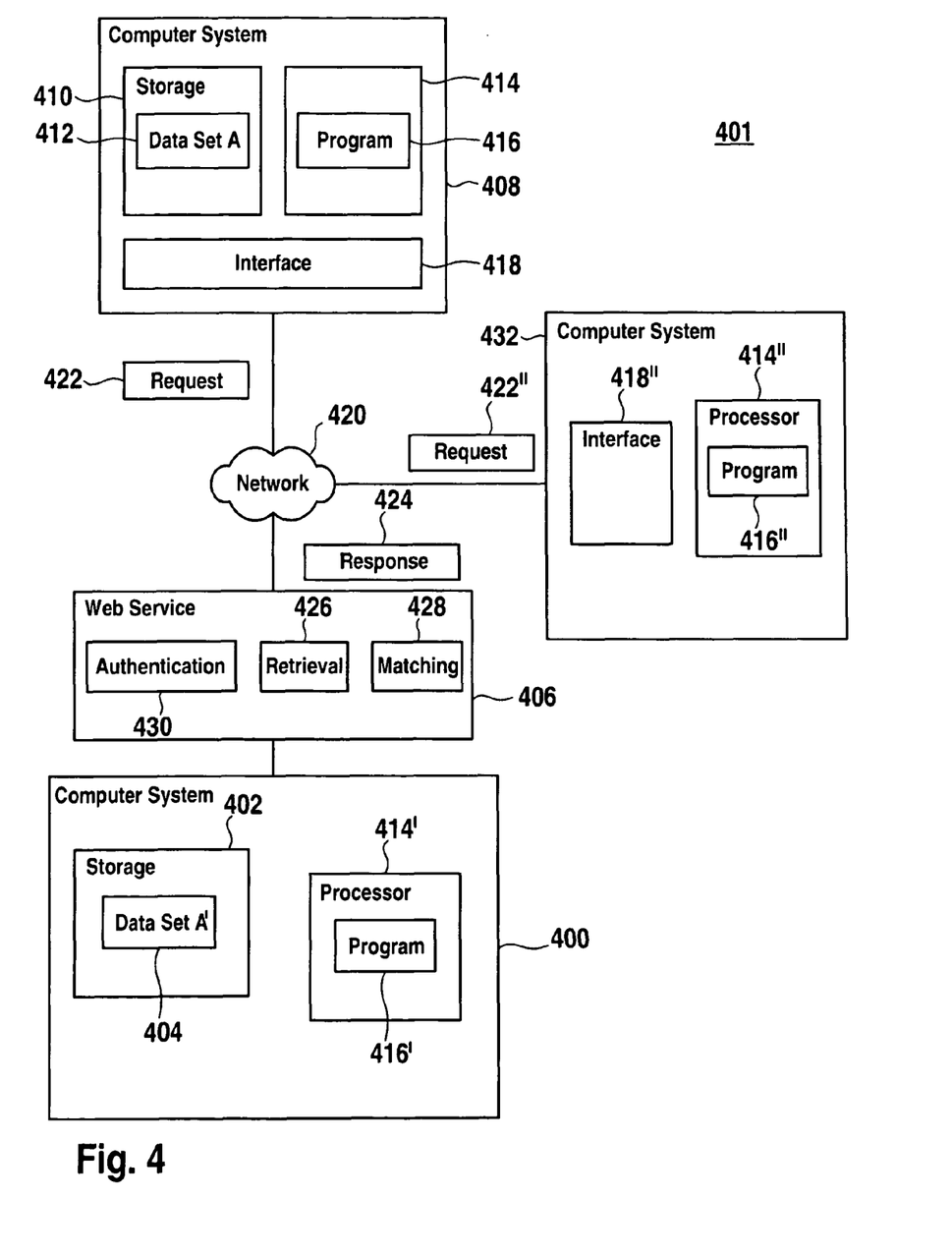
FIG. 4 is a block diagram of a third data processing system, consistent with an embodiment of the invention.

FIG. 4 shows still another exemplary data processing system 401, consistent with an embodiment of the invention. Elements in the embodiments of FIG. 4 that correspond to elements in the embodiments of FIGS. 1 and 3 are designated by like reference numerals. The computer system 400 in the embodiment of FIG. 4 includes a processor 414' for executing a program 416'. In one embodiment, the pro-grams 416, 416' are similar enterprise resource planning programs, such as SAP R/3™ systems.

Web service 406 may include an authentication component 430 that restricts access to the data consistency check service provided by the Web service 406 to authorized requestors. The authorization can be performed on the basis of any known authorization method, such as password based methods, digital signature, Home Banking Computer Interface (HBCI), etc.

In one embodiment, network 420 is a public network (e.g., the Internet) and computer system 432 is coupled to the network 420 by means of its interface 418". Computer system 432 has a processor 414" for executing a program 416" that may be an enterprise resource planning system similar to the programs 416 and 416', a specialized certified public accountant's software, etc.

In operation, both programs 416 and 416" can generate requests 422 and 422", respectively for requesting a data consistency check. In one embodiment, be-fore a request can be processed, authentication of the requesting computer system is performed using authentication component 430. In order to generate the request 422", computer system 432 sends a request to computer system 408 to obtain a copy of the dataset A. The request 422" is then sent to the Web service 406.

The response 424 generated by the Web service is sent to the requestor (e.g., computer system 408 or computer system 432). For example, in one embodiment, the dataset A is an electronic ledger that contains account postings where each posting has an assigned posting date. The dataset A' is a corresponding ledger that contains respective postings with posting dates. For example, the dataset A is a ledger of payment items whereas the dataset A' is a ledger of receivables. The postings contained in the dataset A and A' are auditable such that each posting has an as-signed posting date. In order to perform a balance confirmation with respect to a specific reference date, the request 422 generated by computer 408 includes a reference date. As a result, Web service 406 performs the consistency check (e.g., the balance confirmation check), only with respect to those postings contained in the dataset A' that have a posting date that is before or equal to the reference date specified in the request 422.

While illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A data processing system, comprising:
a computer system that provides a Web service configured to receive a request for a data consistency check from a requestor via a network, the request comprising a first set of data that includes a plurality of first data items, a first identifier associated with the first set of data, and a reference date; and
a storage system, connected to the computer system, for storing one or more sets of data, the one or more sets of data comprising pluralities of data items,
wherein the computer system that provides the Web service is further configured to, in response to the request, perform the following operations with at least one processor:
retrieve a second set of data from the storage based on the first identifier, the retrieved second set of data being associated with a second identifier that matches the first identifier, and the retrieved second set of data comprising a plurality of second data items;
perform the data consistency check on the received first set of data and the retrieved second set of data, the data consistency check comprising:
selecting a subset of the plurality of first data items that have a posting date that is before or equal to the reference date;
selecting a subset of the plurality of second data items that have a posting date that is before or equal to the reference date;
determining whether the subset of the plurality of first data items are identical to the subset of the plurality of second data items; and
determining, when the subset of the plurality of first data items are not identical to the subset of the plurality of second data items, whether a transformation transforms the subset of the plurality of first data items into the subset of the plurality of second data items;
generate a response indicating a result of the data consistency check; and
send the response to the requestor via the network.

2. The data processing system of claim 1, wherein the request for the data consistency check comprises an extended markup language (XML) file that includes the first identifier and the plurality of first data items of the first set of data.

3. The data processing system of claim 1, wherein the Web service is configured to receive the request in a SOAP envelope.

4. The data processing system claim 1, wherein the first set of data comprises at least one control parameter.

5. The data processing system of claim 1, wherein the first set of data comprises at least one posting.

6. The data processing system of claim 1, wherein the data consistency check further comprises determining whether the plurality of first data items match the plurality of second data items.

7. A computer-implemented method of checking data consistency, the method comprising the following steps performed by one or more processors:
   receiving, at a Web service provided by a computer system, a request for performing a data consistency check from a requestor, the request for performing the data consistency check comprising a first set of data that includes a plurality of first data items, first identifier associated with the first set of data, and a reference date;
   retrieving a second set of data by the Web service using the first identifier, the retrieved second set of data including a plurality of second data items, and the retrieved second set of data being associated with a second identifier that matches the first identifier;
   performing, using the Web service, the data consistency check on the received first set of data and the retrieved second set of data, the data consistency check comprising:
      selecting a subset of the plurality of first data items that have a posting date that is before or equal to the reference date;
      selecting a subset of the plurality of second data items that have a posting date that is before or equal to the reference date;
      determining whether the subset of the plurality of first data items are identical to the subset of the plurality of second data items; and
      determining, when the subset of the plurality of first data items are not identical to the subset of the plurality of second data items, whether a transformation transforms the subset of the plurality of first data items into the subset of the plurality of second data items;
   generating a response indicating a result of the data consistency check; and
   sending the response to the requestor by the Web service.

8. The method of claim 7, wherein the retrieving comprises searching for the second set of data using the first identifier as a search criterion.

9. The method of claim 7, wherein the request for the data consistency check comprises an extended markup language (XML) file that includes the first identifier and the plurality of first data items of the first set of data.

10. The method of claim 7, wherein the data consistency check further comprises determining whether the plurality of first data items match the plurality of second data items.

11. A tangibly-embodied computer program product stored on a computer-readable medium, and comprising executable instructions that, when executed, cause a computer system running a Web service to perform the steps of:
   receiving, at the Web service, a request for performing a data consistency check from a requestor, the request for performing the data consistency check comprising a first set of data that includes a plurality of first data, first identifier associated with the first set of data, and a reference date;
   retrieving a second set of data by the Web service using the first identifier, the second set of data including a plurality of second data items, and the retrieved second set of data being associated with a second identifier that matches the first identifier;
   performing, using the Web service, the data consistency check on the received first set of data and the retrieved second set of data, the data consistency check comprising:
      selecting a subset of the plurality of first data items that have a posting date that is before or equal to the reference date;
      selecting a subset of the plurality of second data items that have a posting date that is before or equal to the reference date;
      determining whether the subset of the plurality of first data items are identical to the subset of the plurality of second data items; and
      determining, when the subset of the plurality of first data items are not identical to the subset of the plurality of second data items, whether a transformation transforms the subset of the plurality of first data items into the subset of the plurality of second data items;
   generating a response indicating a result of the data consistency check; and
   sending the response to the requestor by the Web service.

12. The computer program product of claim 11, wherein the retrieving further comprises searching for the second set of data using the first identifier as a search criterion.

13. The computer program product of claim 11, wherein the request for the data consistency check comprises an extended markup language (XML) file that includes the first identifier and the plurality of first data items of the first set of data.

14. The computer-program product of claim 11, wherein the data consistency check further comprises determining whether the plurality of first data items match the plurality of second data items.

15. A data processing system, comprising:
   means for storing a first set of data including a plurality of first data items;
   means for generating a request for performing a data consistency check, the request comprising a first identifier, the first set of data, and a reference date;
   means for sending the request for performing the data consistency check to a Web service and for receiving a response from the Web service, the response being indicative of a result of the data consistency check, wherein:
      the Web service retrieves a plurality of second data items in a second set of data using the first identifier, the retrieved second set of data being associated with a second identifier that matches the first identifier; and
      the data consistency check by the Web service comprises:
         selecting a subset of the plurality of first data items that have a posting date that is before or equal to the reference date;
         selecting a subset of the plurality of second data items that have a posting date that is before or equal to the reference date;
         determining whether the subset of the plurality of first data items are identical to the subset of the plurality of second data items; and
         determining, when the subset of the plurality of first data items are not identical to the subset of the plurality of second data items, whether a transformation transforms the subset of the plurality of first data items into the subset of the plurality of second data items; and
   means for processing the response.

16. The data processing system of claim 15, further comprising means for coupling the Web service to an industrial automation component.

17. The data processing system of claim 15, further comprising an enterprise resource planning software component.

18. The data processing system of claim 15, wherein the data consistency check further comprises determining whether the plurality of first data items match the plurality of second data items.

19. A computer-implemented method of requesting a data consistency check, the method comprising the following steps performed by a one or more processors:
generating a request for performing a data consistency check, the request comprising a first set of data that includes a plurality of first data items, first identifier associated with the first set of data, and a reference date;
sending the request for performing the data consistency check to a Web service;
receiving a response from the Web service, the response indicating a result of the data consistency check of the first set of data in the request and a second set of data performed by the Web service,
wherein:
the Web service retrieves a plurality of second data items in a second set of data using the first identifier, the second set of data being associated with a second identifier that matches the first identifier; and
the data consistency check by the Web service comprises:
selecting a subset of the plurality of first data items that have a posting date that is before or equal to the reference date:
selecting a subset of the plurality of second data items that have a posting date that is before or equal to the reference date;
determining whether the subset of the plurality of first data items are identical to the subset of the plurality of second data items; and
determining, when the subset of the plurality of first data items are not identical to the subset of the plurality of second data items, whether a transformation transforms the subset of the plurality of first data items into the subset of the plurality of second data items; and
processing the response.

20. A computer program product stored on a computer readable medium, and including computer executable instructions that, when executed, cause a computer system to perform the method of claim 19.

21. The method of claim 19, wherein the data consistency check further comprises determining whether the plurality of first data items match the plurality of second data items.

22. A method of checking a ledger of accounts receivables and a ledger of accounts payables for consistency, the ledger of accounts receivables being stored on a first computer system and the ledger of accounts payables being stored on a second computer system, the method comprising:
generating a request for a data consistency check by the first computer system, the request comprising postings of the ledger of accounts receivables, an identifier associated with the postings, and a reference date;
sending, by the first computer system, the request for the data consistency check to a Web service at a third computer system coupled between the first computer system and the second computer system, wherein the third computer system is separate from the first computer system and from the second computer system;
using the Web service to:
determine whether the first computer system is authorized to request the data consistency check;
retrieve postings of the ledger of accounts payables from the second computer system using the identifier, the retrieved postings having an identifier that matches the identifier of the first computer system, when the first computer is authorized to request the data consistency check; and
perform the data consistency check on the postings received in the request and the retrieved postings of the ledger of accounts payables, the data consistency check comprising:
selecting a subset of the received postings of the ledger of the account receivable that have a posting date that is before or equal to the reference date;
selecting a subset of retrieved postings of the ledger of accounts payables that have a posting date that is before or equal to the received reference date;
determining whether the subset of the received postings of the ledger of the account receivable are identical to the subset of the retrieved postings of the ledger of accounts payables; and
determining, when the subset of the received postings of the ledger of the account receivable are not identical to the subset of the retrieved postings of the ledger of accounts payables, whether a transformation transforms the subset of the received postings of the ledger of the account receivable into the subset of the retrieved postings of the ledger of accounts payables;
generating a response indicating a result of the data consistency check; and
sending the response to the first computer system.

23. The method of claim 22, wherein the response indicates one or more of the postings in the request that do not match the ledger of accounts payables.

24. A distributed data processing system, comprising a first computer system and a second computer system,
the first computer system being configured to:
store a first set of data that includes a plurality of first data items;
generate a request for performing a data consistency check, the request comprising a reference date, an identifier of the first computer system, and the first set of data;
send the request to a Web service and for receiving a response from the Web service, the response being indicative of a result of the data consistency check; and
process the response, and the second computer system being configured to:
receive, at the Web service, the request from the first computer system via a network; and
store, at a storage coupled to the Web service, one or more sets of data, the one or more sets of data comprising pluralities of data items,
wherein the Web service is configured to, in response to the request:
retrieve a second set of data from the storage, the retrieved second set of data being associated with a second identifier that matches the identifier of the first computer system, and the retrieved second set of data comprising a plurality of second data items;

perform the data consistency check on the first set of data received in the request and the accessed second set of data, the data consistency check comprising:

selecting a subset of the plurality of first data items that have a posting date that is before or equal to the reference date;

selecting a subset of the plurality of second data items that have a posting date that is before or equal to the reference date;

determining whether the subset of the plurality of first data items are identical to the subset of the plurality of second data items; and determining, when the subset of the plurality of first data items are not identical to the subset of the plurality of second data items, whether a transformation transforms the subset of the plurality of first data items into the subset of the plurality of second data items;

generate a response indicating a result of the data consistency check; and send the response to the first computer system via the network.

25. The distributed data processing system of claim 24, further comprising a third computer system, the third computer system configured to request, from the first computer system, the first set of data stored on the first computer system, to generate the request, to send the request to the Web service, and to receive the response from the Web service.

26. The distributed data processing system of claim 24, wherein:

the Web service is further configured to select a sub-set of the second data items;

the sub-set of the second data items includes second data items that have a time stamp indicating a time prior to the reference time; and the data consistency check is only performed for the selected sub-set of the second data items.

\* \* \* \* \*